United States Patent
Yoon et al.

[11] Patent Number: 5,601,710
[45] Date of Patent: Feb. 11, 1997

[54] FILTERING APPARATUS OF WATER PURIFIER

[75] Inventors: Deok-Joung Yoon; In-Seog Chung, both of Suwon, Rep. of Korea

[73] Assignee: Samsung Electronics Co., Ltd., Suwon, Rep. of Korea

[21] Appl. No.: 500,060

[22] Filed: Jul. 10, 1995

[30] Foreign Application Priority Data

| Jul. 8, 1994 | [KR] | Rep. of Korea | 94-16944 |
| Sep. 30, 1994 | [KR] | Rep. of Korea | 94-25719 |
| Sep. 30, 1994 | [KR] | Rep. of Korea | 94-25722 |
| Nov. 14, 1994 | [KR] | Rep. of Korea | 94-30251 |
| Nov. 14, 1994 | [KR] | Rep. of Korea | 94-30252 |

[51] Int. Cl.$^6$ ................................................ B01D 27/08
[52] U.S. Cl. ............ 210/232; 210/264; 210/321.6; 210/454; 210/455; 210/497.01; 210/497.1
[58] Field of Search ........................... 210/232, 264, 210/282, 321.6, 321.74, 321.76, 321.83, 321.85, 416.3, 433.1, 440, 441, 442, 443, 444, 453, 454, 455, 493.4, 497.01, 497.1, 497.2

[56] References Cited

U.S. PATENT DOCUMENTS

| 3,950,253 | 4/1976 | Stern | 210/416.3 |
| 4,212,743 | 7/1980 | Van Meter et al. | 210/433.1 |
| 4,997,563 | 3/1991 | Jones | 210/416.3 |
| 5,084,168 | 1/1992 | Woog | 210/266 |
| 5,092,993 | 3/1992 | Goodwin | 210/232 |
| 5,128,037 | 7/1992 | Pearl et al. | 210/321.74 |
| 5,256,285 | 10/1993 | Tomita et al. | 210/440 |
| 5,296,148 | 3/1994 | Colangelo et al. | 210/416.3 |

*Primary Examiner*—W. L. Walker
*Attorney, Agent, or Firm*—Burns, Doane, Swecker & Mathis, L.L.P.

[57] ABSTRACT

A water purifier includes an outer housing, an inner housing disposed in the outer housing, and a filter element disposed in the inner housing. The outer and inner housings have top openings, respectively, each closed by a lid. The inner housing and filter element can be removed as a unit from the outer housing when the lid of the outer housing is removed. The outer and inner housings include interconnected water inlets for admitting unfiltered water, interconnected filtered-water outlets for discharging filtered water, and interconnected unfiltered-water outlets for discharging unfiltered water when the filter element is to be replaced. The filtered-water outlets and unfiltered-water outlets are disposed adjacent the bottom of said outer housing. Valves can be provided in the water inlets, the filtered-water outlets and the unfiltered-water outlets, which valves are biased closed when the inner housing is removed from the outer housing, and which are opened in response to the inner housing being installed in the outer housing.

24 Claims, 9 Drawing Sheets

FILTERING APPARATUS OF WATER PURIFIER

BACKGROUND OF THE INVENTION

1. Field of the Invention

The present invention relates to a water purifier for eliminating various harmful substances contained in original water such as faucet water or the like to thereby make the water potable, and more particularly to a filtering apparatus of a water purifier, by which the installation and removal of a filter can be simplified and filtering ability can be remarkably increased.

2. Description of the Prior Art

Generally, a purifier serves to perform a water purifying operation by passing the original water or faucet water (hereinafter referred to as water) supplied from a faucet through a separate filter, to thereby remove foreign objects or harmful substances contained therein.

The water purifier thus constructed can be roughly classified, according to purifying method, into a natural purifying method, a directly-connected purifying method, an ion exchange resin method, a reverse osmotic pressure method and the like. Among these methods, a water purifier by way of the reverse osmotic pressure method is operated to perform the water purifying by applying a predetermined pressure to the water to thereby cause the water to pass through an artificial osmotic membrane, whereby heavy metal, bacteria, cancer-causing materials and the like are separately removed, and at the same time, only the pure water and dissolved oxygen are passed, enabling the same to be used for scientific industries, cleaning of hyper precision electronic parts and for medical use.

The water purifier having the above-mentioned construction is widely used as one for supplying purified water to private households and business sectors because of serious environmental pollution.

The water purifier thus described, as illustrated in FIG. 1, includes a water purifying tank 2 releasably disposed at an upper side of a pad 1 for storing the water, a receptacle unit 3 disposed at a rear side of the water purifying tank 2, a filtering apparatus 6 disposed within the receptacle unit 3 to eliminate various harmful substances included in the water supplied through a water supply tube 5 connected to a faucet 4, a purified water tube 7 connected to at the filtering apparatus 6 to supply into the water purifying tank 2 the purified water, and a disposer 9 arranged on the water purifying tank 2 for disposing the purified water stored in the water purifier tank 2 according to manipulation of a lever 9, so that purified water disposal can be possible.

Meanwhile, the filtering apparatus 6 for removing and purifying the harmful substances contained in the water includes, as illustrated in FIG. 2, an upper body 10 having an entrance 10a and an exit 10b connected to the water supply tube 5 and the water purifying tube 7, and a lower body 12 releasably disposed at a lower side of the upper body 10 by a fastening member 11. The lower body 12 is provided therein with a filtering member 13 for eliminating various harmful materials contained in the water, and the lower body 12 and the filtering member 13 form a water passage 14 for guiding the water. The filtering is formed with a central water passage 15 for circulating the purified water which has passed the filtering member 13.

Accordingly, when the water under a predetermined pressure is supplied into the filtering apparatus 6 from the faucet 4, the filtering apparatus 6 serves to eliminate various harmfull substances contained in the water.

In other words, the water infused into the upper body 10 through entrance 10a connected to the water supply means 5 passes through the filtering member 13 through water passage 14 to thereafter be turned into purified water, whereby the purified water is in return infused into the upper body 10 through a purified water passage 15 formed in the filtering member 13 to thereby be conducted to the purified water tank 2 through outlet 10b and the purified water tube 7.

The purified water stored in the purified water tank 2 is discharged through the faucet 9 according to opening of lever 8, so that disposal of the purified water can be possible.

Meanwhile, the filtering member absorbed with various harmful substances should be replaced after a predetermined period. At this time, when the lower body 12 is supposed to be removed, the fastening member 11 is pushed upwards and the lower body 12 is separated from the upper body 10 or assembled.

However, according to the conventional filtering apparatus thus constructed, there are problem in that draining of the water and the purified water is profuse from the upper body when the lower body is separated, and the fastening member is complicated in construction.

There are other problems in the conventional filtering apparatus in that replacement procedures of the filtering member are very inconvenient, and purifying capability of the filtering member is therefore decreased to shorten the life of the filtering member markedly.

SUMMARY OF THE INVENTION

Accordingly, the present invention has been provided to solve the afore-said problems and it is an object of the present invention to provide a filtering apparatus of a water purifier by which assembly and separation of the filtering member are simplified to thereby provide a convenience in using it, and at the same time, leakage of the water can be prevented when the filtering member is replaced.

It is another object of the present invention to provide a filtering apparatus of a water purifier in which the capability of water purifying can be improved and the life of apparatus can be extended.

It is still another object of the present invention to provide a filtering apparatus of a water purifier by which a filtering member can be easily replaced.

If is further another object of the present invention to provide a filtering apparatus of a water purifier by which the water can be infused into a carbon filter from an entire outer surface of the carbon filter which is wound several times around a central pipe in a scroll shape, so that life of the filter can be prolonged and filtering capacity thereof can be increased.

In accordance with one object of the present invention, there is provided a filtering apparatus of a water purifier, the filtering apparatus comprising:

an outer housing for being opened at an upper side thereof and employing a plurality of water holes, purified holes and unfiltered holes to thereby enable inflow and outflow of the water, purified water and unfiltered water;

an inner housing for being insertedly and releasably arranged within the outer housing;

a filtering member for removing harmful substances contained in the water stored in the inner housing;

a purified water tube for being formed with a plurality of purified water infuse holes so that the purified water for having passed the filtering member can be used; and an inner lid and an outer lid for being separably assembled with the outer housing and the inner housing.

In accordance with another object of the present invention, there is provided a filtering apparatus of a water purifier, the filtering apparatus further comprising:

a case;

a housing fixedly disposed at the case;

a filtering member for being releasably assembled in the housing so as to remove the harmful substances contained in the water; and a housing cover for being assembled to the housing through the case, so that the filtering member can be easily replaced without recourse to separating the housing from the case, and at the same time, the filtering member can be sealed from outside.

In accordance with still another object of the present invention, there is provided a filtering apparatus of a water purifier, the filtering apparatus still further comprising:

a scroll-shaped carbon filter;

a purified water tube disposed in the carbon filter in order to flow downward the water which has passed the carbon filter;

an inner housing for being disposed at an outside of the carbon filter at a predetermined interval from a periphery of the carbon filter so that the water to be purified can be infused from the entire surface of the periphery of the carbon filter into the carbon filter:

an inner lid for being tightly assembled to an upper surface of the inner housing so that the carbon filter can be supported, and at the same time, can be sealed;

an outer housing for being assembled to an outside of the inner housing so that the inner housing can be settled and accepted therein; and an outer lid for being assembled to an upper portion of the outer housing so that the inner housing and the inner lid can be sealed from the outside.

Therefore, the replacement of the filtering member is possible upon removal of the inner and outer lids to thereby enable easy replacement of the filtering member and simple releasing of the outer housing.

Furthermore, a closely adjacent relationship of the water hole, purified water hole and unfiltered water hole enables the assembly of water hoses to be simple, and water-purifying capability can be improved by the performance of filtering actions on the entire outer surface of the filtering member.

The separation of the inner housing from the outer housing not only enables an easy replacement of the filtering member but also prevents leakage or backward surge of the water, purified water and the concentrated water, so that it is very convenient to use the water purifier.

Insertion of a protruder of the inner housing in a groove formed at the outer housing makes it possible for the water hole and the water supply passage to be interconnected and for a first valve to be assembled to a second valve for an easier assembly works therebetween.

BRIEF DESCRIPTION OF THE DRAWINGS

For a better understanding of the nature and objects of the present invention, reference should be made to the following detailed description taken is conjunction with the accompanying drawings in which:

FIG. 3 is an exploded longitudinal sectional view of the filtering apparatus according to one embodiment of the present invention, FIG. 4 is a longitudinal sectional view for illustrating an assembled state of the filtering apparatus shown in FIG. 3;

FIGS. 5 and 6 are schematical diagrams similar to FIGS. 3 and 4 for illustrating a second embodiment of a filtering apparatus of a water purifier according to the present invention;

FIG. 5 is a longitudinal sectional view of the assembled components, and wherein:

FIG. 6 is an exploded view of the components of FIG. 5;

FIG. 7 is an exploded longitudinal sectional view of the filtering apparatus, and FIG. 8 is a sectional view for illustrating an assembled state the filtering apparatus shown in FIG. 7.

DETAILED DESCRIPTION OF PREFERRED EMBODIMENTS OF THE INVENTION

Figure 1:
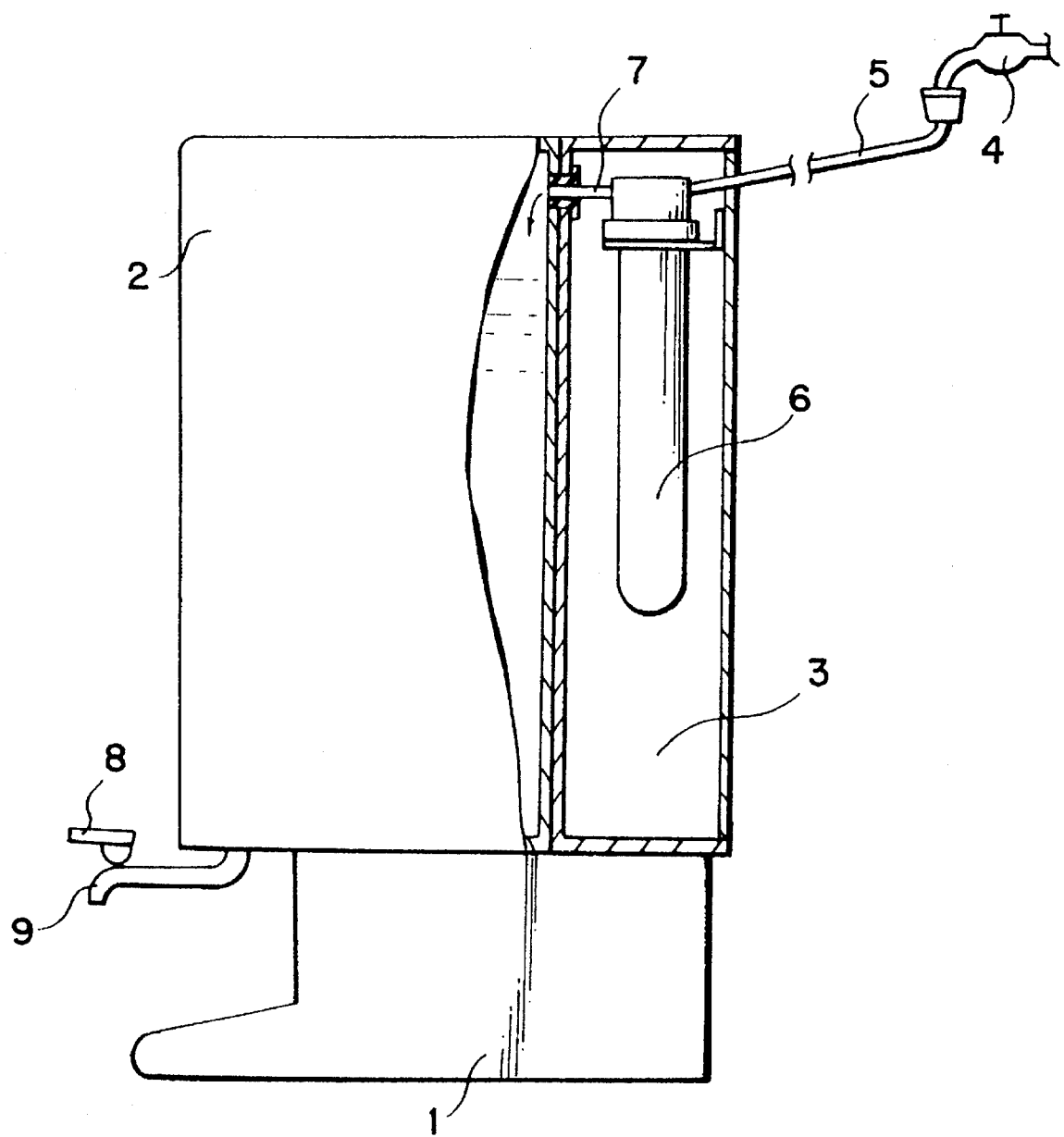
FIG. 1 is a partially cut-open side view of a conventional water purifier.
Figure 2:
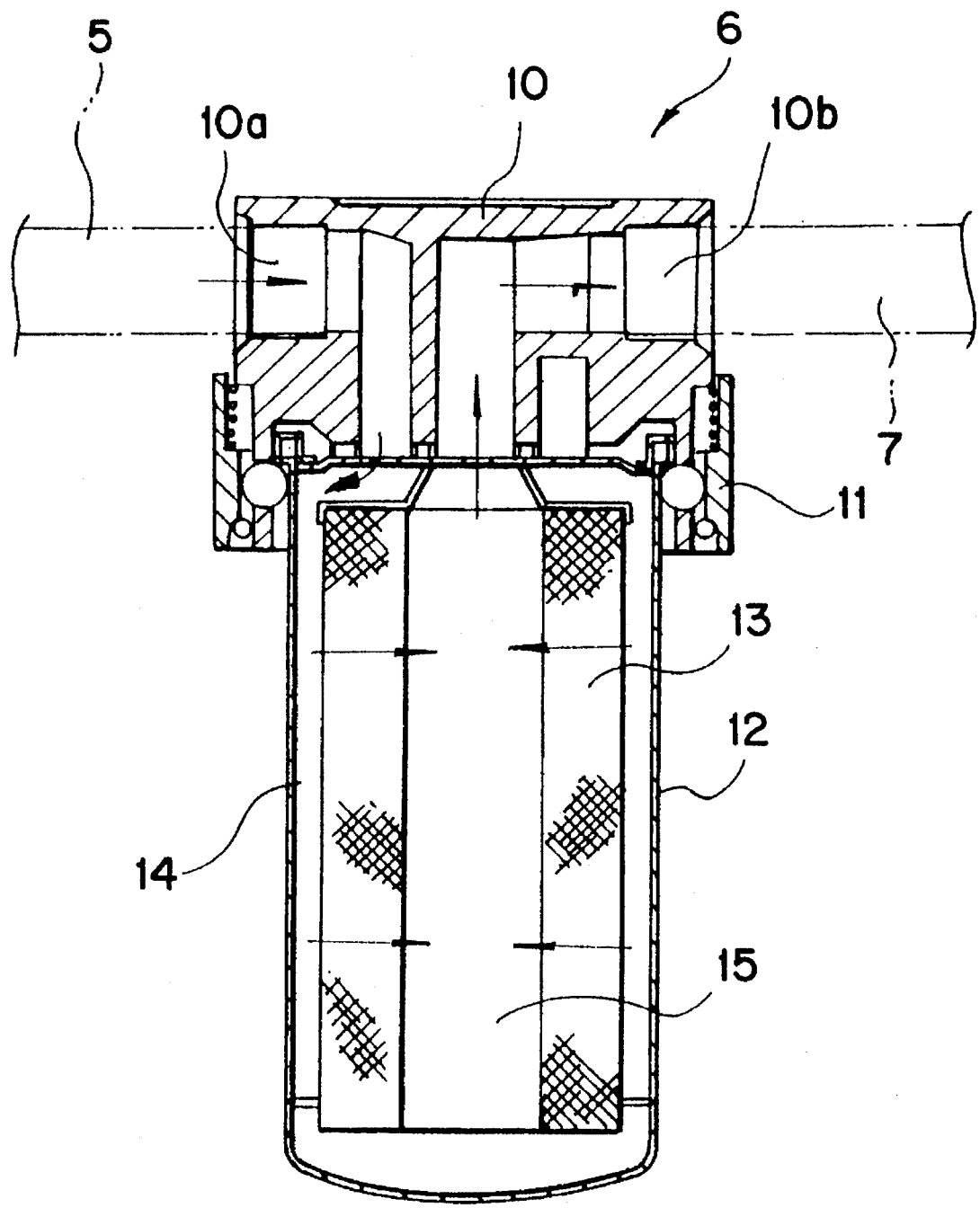
FIG. 2 is a sectional view of the conventional water purifier with a filtering apparatus assembled therein.

One embodiment of a filtering apparatus of a water purifier according to the present invention will be described in detail with reference to FIGS. 3 and 4.

Reference numeral 100 in the drawings is a filtering apparatus for eliminating various harmful substances included in the water, The filtering apparatus 100 includes an outer housing 110 wherein there is formed a water hole 110a open at an upper side thereof for introducing unpurified water, a purified water hole 110b for discharging the purified water and a concentrated water hole 110c for discharging non-purified water containing the harmful substances. An inner housing 120 is arranged within the outer housing 110 which forms a plurality of downwardly protruded tubes 120a, 120b and 120c connectible with the water hole 110a, purified water hole 110b and the concentrated water hole 110c, respectively.

The inner housing 120 is formed at one side thereof with a vertical water supply passage 121 adapted for being inter-connected with the water hole 110a and the tube 120a so that the water can be supplied therethrough.

Furthermore, the inner housing 120 houses a filtering member 130 for absorbing and removing the harmful substances, when the water supplied by the water supply passage 121 passes therethrough. The inner housing includes a vertical purified water tube 140 extending centrally through the filtering member and formed with a plurality of purified water infuse holes 140a so that the purified water having passed the filtering member 130 can flow into the tube 140.

The purified water tube 140 insertedly disposed at a lower end inserted into a lower end support unit 122 formed on a floor of the inner housing 120.

Meanwhile, a guide member 150 is assembled to an outer side of the filtering member 130 and contacts an inner side of the housing 120 so that the water infused through the water supply passage 121 can flow to an outer side of the filtering member 130. The inner housing 120 is provided at an upper side thereof with an inner lid 160 having an upper end support unit 161 in which the upper end of the purified water tube 140 is inserted.

The upper end of the outer housing 110 is screwed to an outer lid 180 having a sealing member 170.

It should be noted that the water hole 110a, purified water hole 110b, concentrated water hole 110c and protruded tubes 120a, 120b and 120c can be formed in appropriate numbers according to like the intended function of the filtering member 130.

The filtering member 130 is wound in a scroll-shape or in a spiral-shape around the outer periphery of the tube 140 and then positioned within the inner housing 120 so that the water to be purified can travel through the entire outer surface of the filtering member 130 to thereby be purified.

The outer housing 110 is so disposed that the inner housing 120 and inner lid 160 are tightly sealed with respect to the outside, and the outer housing 110 is screwed to an outer lid 180.

Numerals 190a and 190b in the drawings denote sealing surfaces of respective tubes 120a, 120b and 120c and purified water tube 140, whereby the water, purified water and the concentrated water cannot leak out of respective tubes.

The operation of a water purifier thus constructed according to the first embodiment of the present invention will now be described.

First of all, the water infused through the water hole 110a flows toward the inner lid 160 through the tube 120a and the water supply passage 121, and then to an outer periphery of the filtering member 130 to thereafter be purified.

The purified water infused toward the inner periphery of the filtering member 130 from the outer periphery thereof is conducted into the purified water tube 140 through the purified water infuse hole 140a, to thereafter be conducted through the protruded tube 120b and the purified water hole 110b to a storage tank (not shown).

Furthermore, the non-purified water containing the harmful substances which have not passed through the filtering member 130 is discharged outside through the tube 120c and the water hole 110c.

Meanwhile, when replacement time comes resulting from sudden decrease of purifying capability of the filtering member 130 in use, the outer lid 180 is separated from the outer housing 110, the inner lid 160 is separated from the inner housing 120, the filtering member 130 and the purified water tube 140 are removed and a new filtering member 130 is inserted onto the tube 140.

After the filtering member 130 is replaced, the inner and outer lids 160 and 180 can be assembled in the reverse order from that of the separation thus described, so that the separation and assembly steps of the filtering member 130 are very easy and simple.

Furthermore, the outer housing 110 is concentratively formed at a lower side thereof with the purified water hole 110b and the non-purified water hole 110c which drain off any water which might otherwise be spilled when the filter is being replaced.

Next, a second embodiment of the present invention will be described with reference to FIG. 5.

Figure 3:
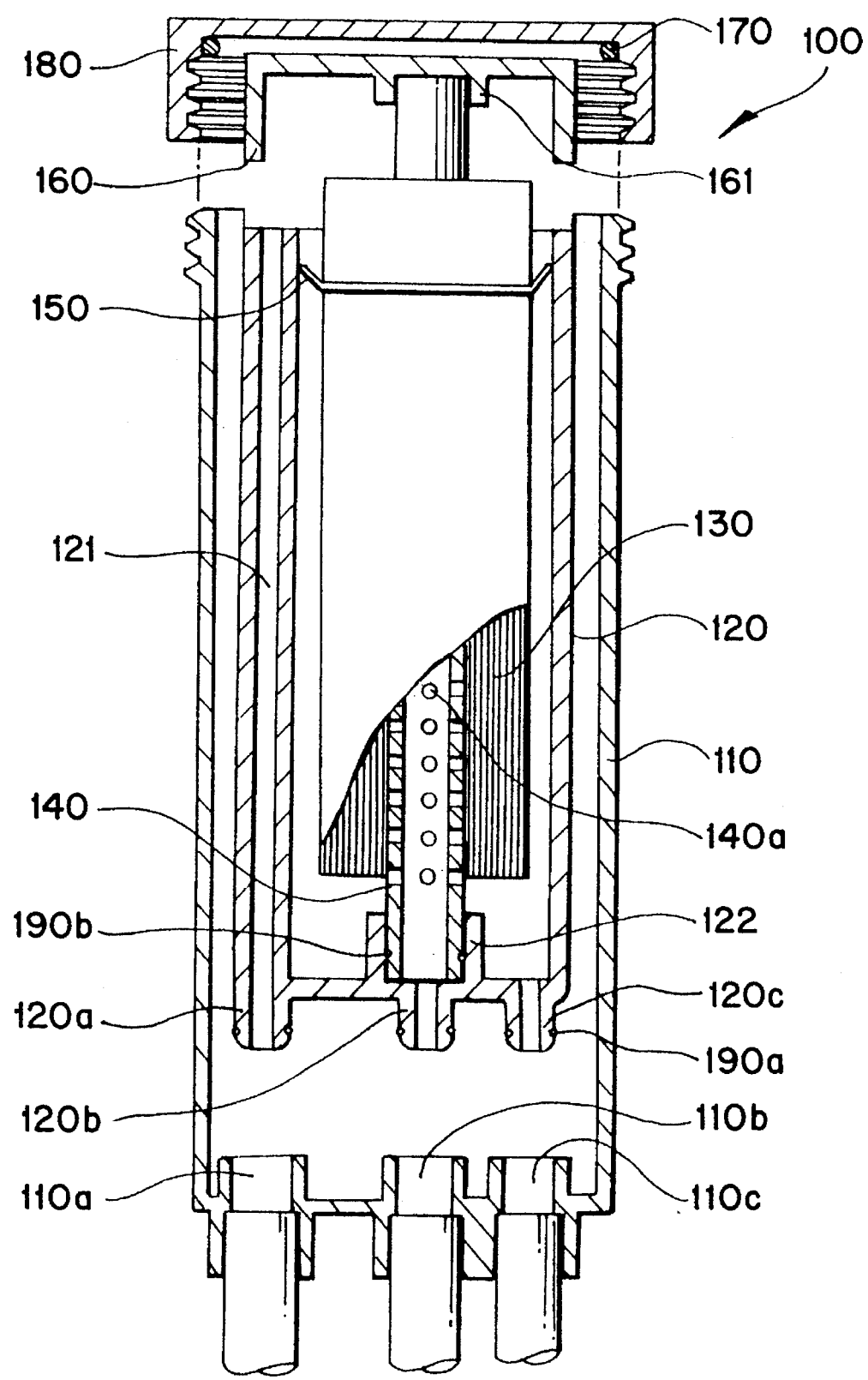
FIGS. 3 to 6 are schematical diagrams for illustrating a filtering apparatus of a water purifier according to one embodiment of the present invention, where.
Figure 4:
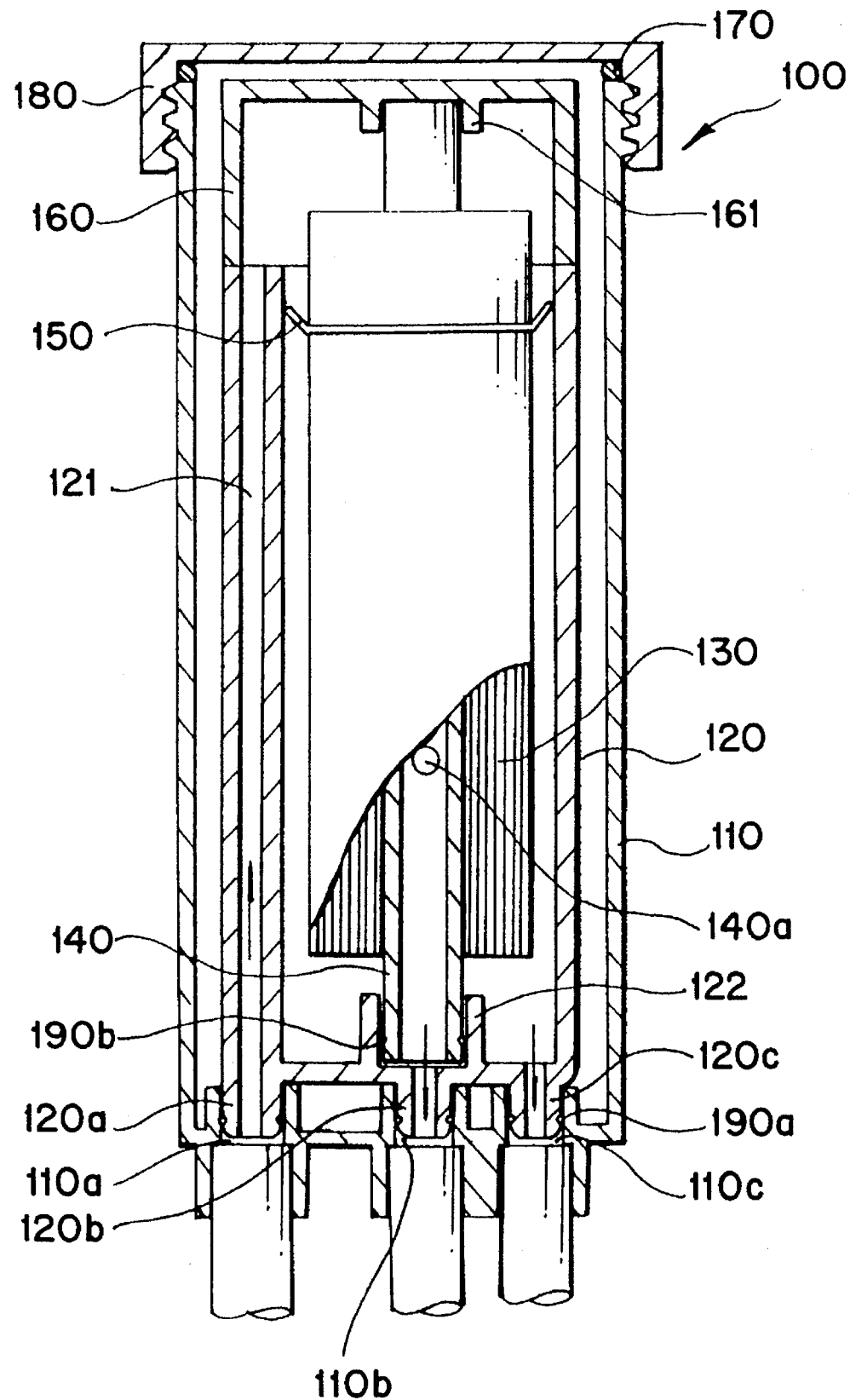

Throughout the drawing, like reference numerals are used for designation of like or equivalent parts as in FIGS. 3 and 4 for simplicity of illustration and explanation, and redundant descriptions are omitted.

Figure 5:
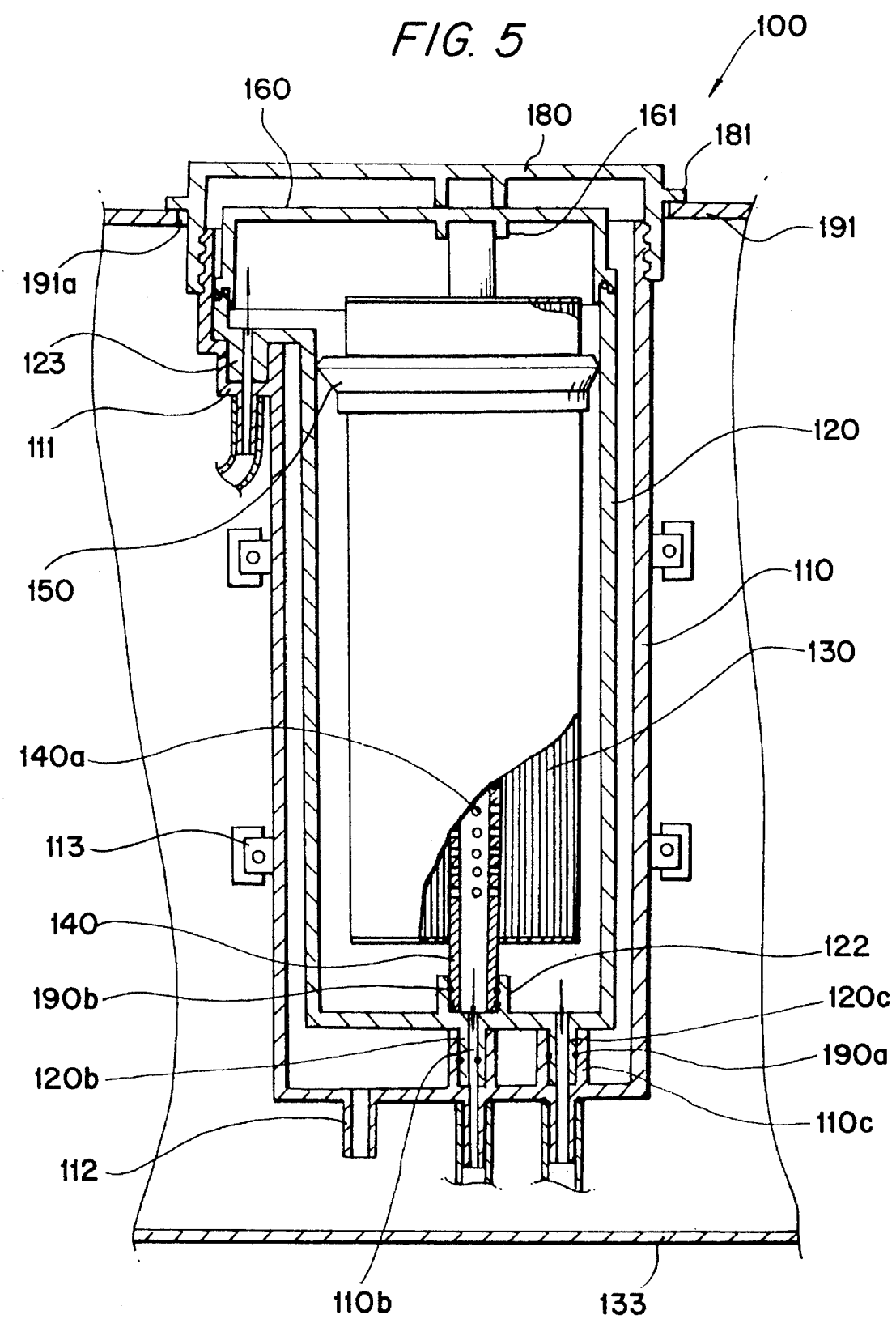
Figure 6:
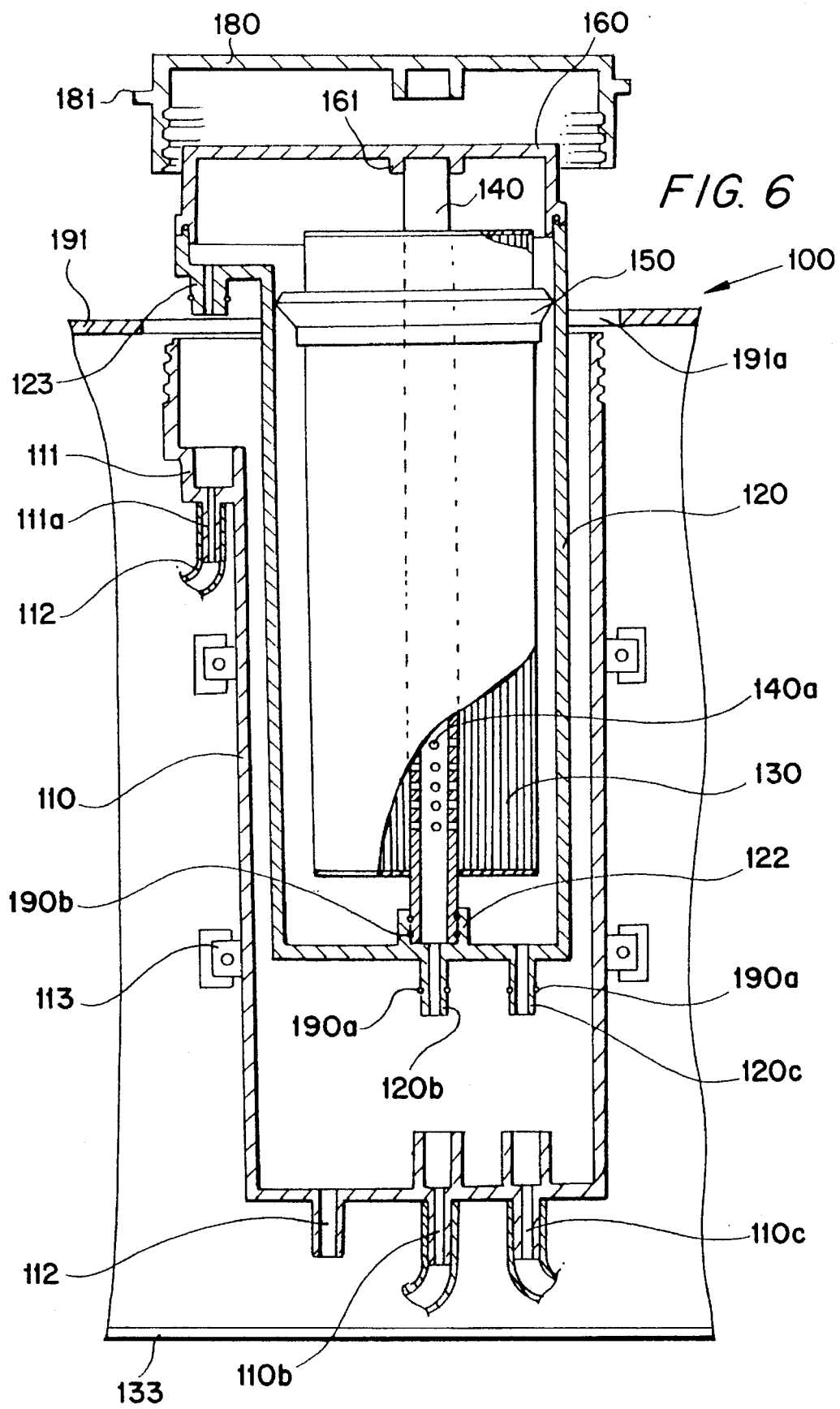

As illustrated in FIG. 5, the outer housing 110 is formed at one side of its periphery with a water infuse tube 111 so that the water can be infused, and at the same time, a discharge hole 112 is formed in order to discharge leaked water stored on the floor thereof. The inner housing 120 is formed at one side thereof with a tube 123 which can be inserted into the water infuse tube 111.

The outer housing 110 is provided at a periphery thereof with a plurality of brackets 113 so that the same can be releasably disposed on a wall surface Or the like by fastening means.

It should be noted that the outer lid 180 can be formed at an outside thereof with a tripping jaw 181 so that the same can be separably and insertedly supported on a fixed plate having a through hole 191a.

The outer housing 110 is formed with a protruding tube 111a for conducting water from the water infuse tube 111. The outer housing 110 is fixed to a case 133 so that the filtering member 130 can be easily replaced without separating the outer housing 110 from the case 133. A water supply tube 112 is connected to one end of the protruding tube 111a.

Furthermore, the fixing plate 191 of the case 133 is formed with a through hole 191a in order to assemble or release the outer housing 110.

The inner housing 120 is so formed as to taper off in diameter in a downward direction, so that the purifying capability of the filtering member 130 can be remarkably increased. A membrane filter, carbon filter or the like is usually used for the filtering member 130.

The carbon filter 130a used for the filtering member 130 can further increase the purifying capability by having a cloth of fabric material coated by activated carbon granules and wound in a spiral shape or scroll shape, to thereby allow the filtering action to be performed on the entire surface thereof.

As seen from the foregoing, the filtering apparatus of a water purifier according to the embodiment of the present invention enables the filtering member to be replaced in response to separation of the outer and inner lids, to thereby facilitate replacement of the filtering member and to simplify the assembly of the outer housing as well.

Furthermore, according to the embodiment of the present invention, the water hole, purified hole and the non-purified water hole are formed near one another to make handy the assembly of respective piping works, and the purifying capability can be increased because the filtering actions are performed at the entire surface of the filtering member.

Now, a third embodiment of a filtering apparatus of a water purifier according to the present invention will be described with reference to FIGS. 7, 8 and 9.

Reference numeral 200 in the drawings denotes a filtering apparatus for employing an outer housing 210 provided at a lower area thereof with a water hole 210a for infusing the unpurified water. A purified water hole 210b is provided for discharging the purified water and a non-purified water hole 210c is provided for discharging the non-purified water.

The outer housing 210 contains the inner housing 220 formed with interconnecting holes 220a and 220b for connecting to the water hole 210b and the concentrated water hole 210c, respectively. The the inner housing 220 is formed at one side thereof with a water supply passage 221 which is inter-connected with the water hole 210a.

The inner housing 220 is provided on a floor surface thereof with a lower end supporting unit 222, and the water supply passage 221 is provided at one side thereof with a downwardly extending pushing protrusion 223.

The inner housing 220 is provided with a filtering member 230 in order to absorb and remove the harmful substances as the water supplied through the water supply passage 221 passes therethrough, and at the same time, is provided with a purified water tube 240 formed with a plurality of purified water infuse holes 240a so that the purified water which has passed through the filtering member 230 can be infused into the water tube 240.

Meanwhile, a guide member 250 is assembled to an outer side of the filtering member 230 so that the water infused through the water supply passage 221 can flow into the filtering member 230. The inner housing 220 is screwed at an upper side thereof to an inner lid 260 which includes a downwardly protruding supporting unit 261 in which an upper end of the purified water tube 240 is inserted.

The upper end of the outer housing 210 is screwed to an upper lid 280 which carries a sealing member 270.

Meanwhile, the outer housing 210 and the inner housing 220 are provided at lower sides thereof with first valves 211a,b,c and second valves 224a,b, which become opened, when the inner housing 220 is installed in the outer housing 210 to thereby accommodate the circulation of fluid, and become closed, when the inner housing 220 is separated from the outer housing 210 to thereby cut off circulation of the fluid.

The first valves 211a,b,c are disposed in the water hole 210a, purified water hole 210b and the non-purified water hole 210c, respectively, and the second valves 224a,b are disposed in the inter-connecting holes 220a and 220b, respectively, of the inner housing 210.

The first valves 211a,b,c include a plurality of outlets 212 separably screwed to lower sides of the water hole 210a, purified water hole 210b and the concentrated water hole 210c, respectively. Each valve 211 a,b,c includes first operation stem 214 biased upwardly by an elastic member 213 to thereby perform up-and-down movements. A plurality of through holes 215a is formed a flange unit 215 disposed at an upper end of the first stem 214, and a valve body 216 is fixedly arranged on the first operation stem 214 to selectively open and close a respective one of the water hole 210a, the purified water hole 210b and the concentrated water hole 210c.

The second valves 224a, b include connecting units 225 screwed to lower sides of the inter-connecting holes 220a and 220b, respectively, and at the same time, tightly inserted onto upper sides of the purified water hole 210b and the concentrated water hole 210c respectively. Each valve 224a,b is provided with a plurality of through holes 225a for circulation of the fluid, and at the same time, is provided with a plurality of downward protrusions 225b, and a valve body 227 fixedly disposed at an upper end of a stem 228 which is slidably disposed within a respective inter-connecting hole 220a and 220b. The stem 228 is biased downwardly by with a resilient member 226 for closing the inter-connecting respective holes 220a and 220b. The stem 228 carries a support unit 228a for supporting the resilient member 226.

The inner housing 220 is tightly assembled at an upper side thereof and the inner lid 260 with a sealing member 271 is disposed therebetween.

Figure 9:
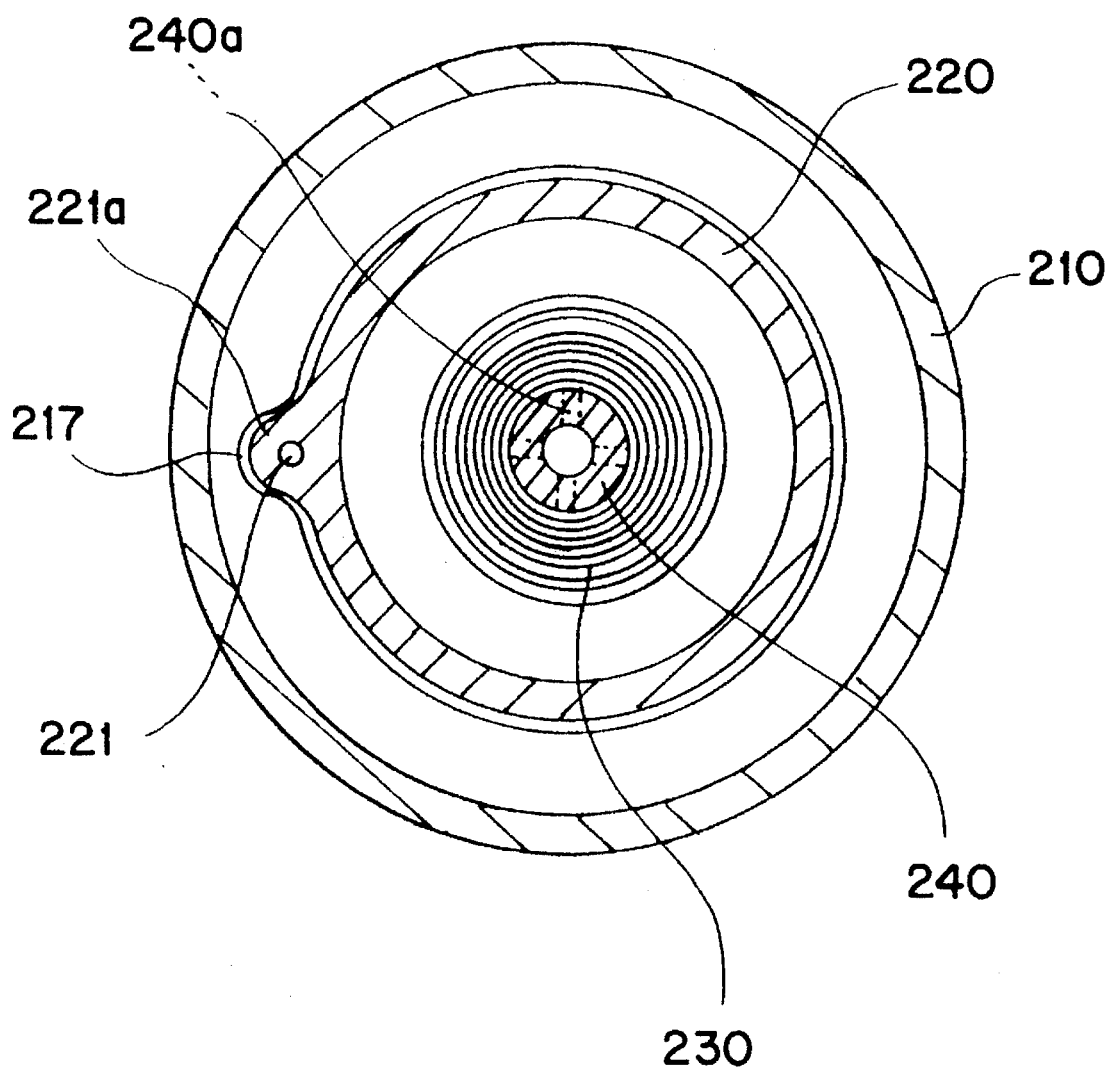
FIG. 9 is a transverse sectional view taken along line 9—9 in FIG. 7.

Meanwhile, FIG. 9 shows a groove 217 formed in an inner side of the outer housing 210. The inner housing 220 is formed with a protrusion 221a forming the water supply passage 221 to thereby facilitate assembly of the inner housing 220 to the outer housing 210, and at the same time, to enable interconnection between the water hole 310a and the water supply passage 221 after the interconnection of the inner housing 220 and to enable an assembly of the first and second valves 211a,b,c and 224a,b.

Figure 7:
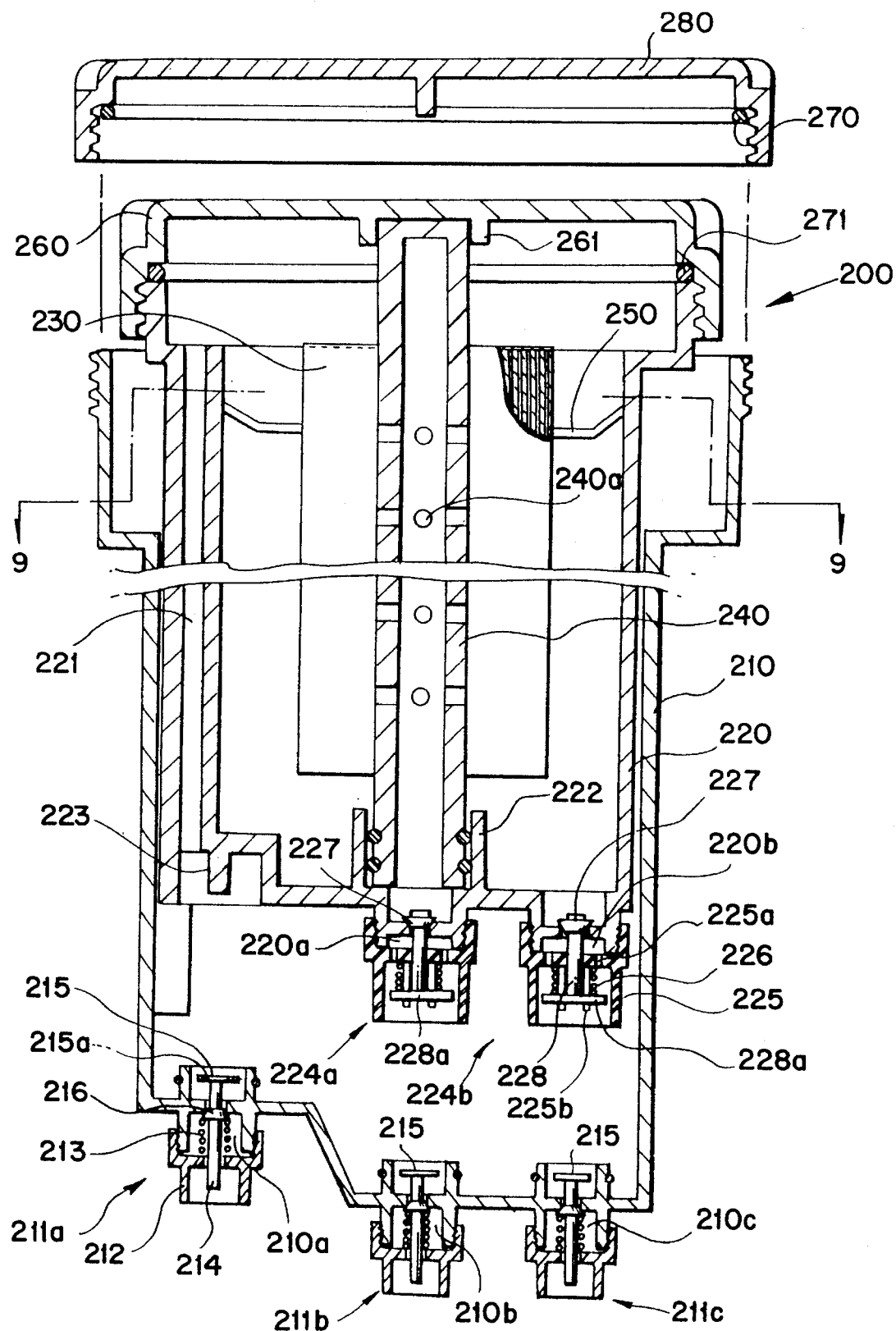
FIGS. 7 and 8 are schematical diagrams for illustrating a filtering apparatus of a water purifier according to a third embodiment Of the present invention, where.
Figure 8:
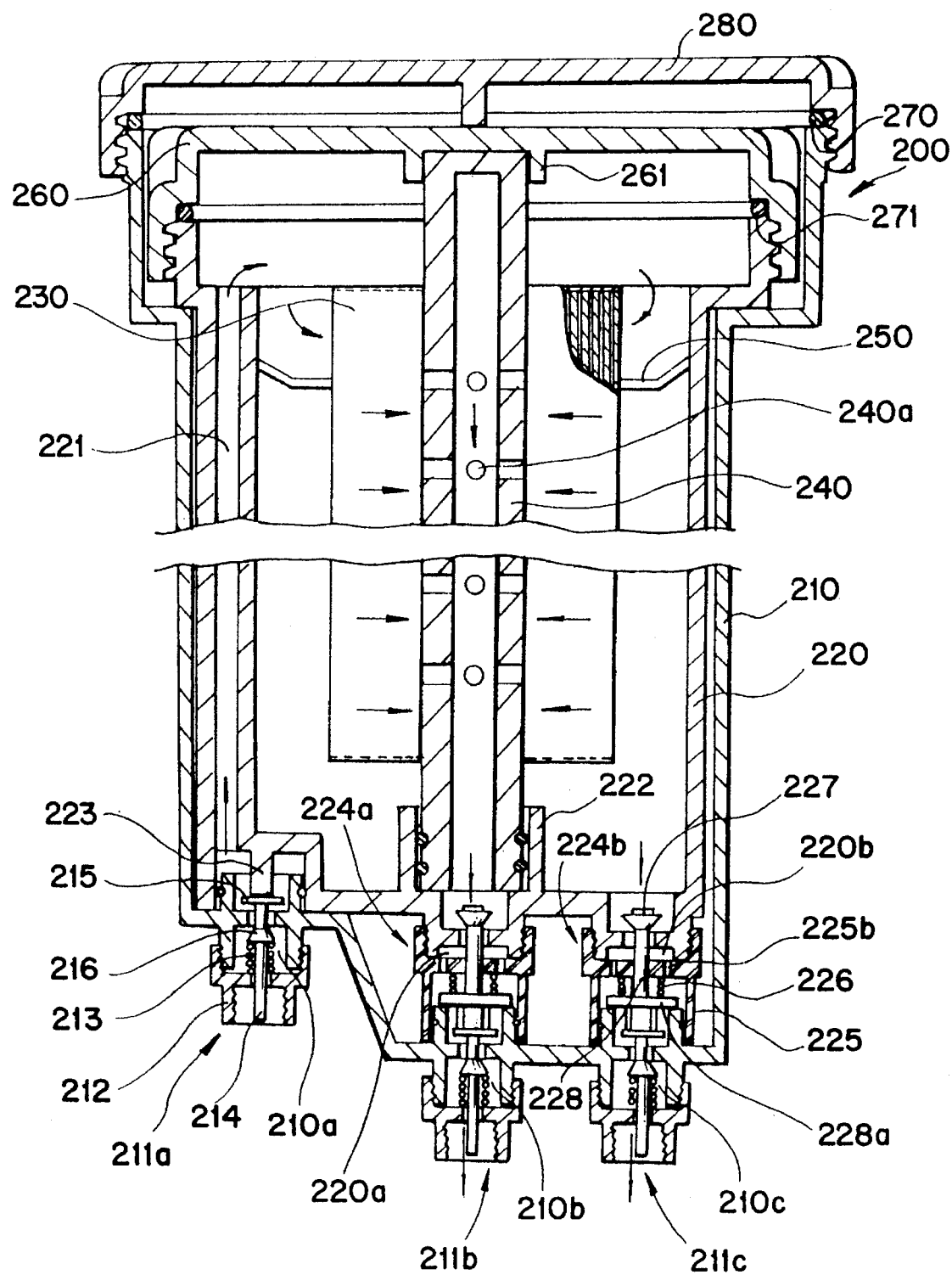

The filtering apparatus of a water purifier thus constructed according to FIGS. 7–9 can be completely assembled when the inner lid 260 is screwed down against the sealing member 271 in a state where the filtering member 230 has been tightly inserted into the inner housing 220. The inner housing 220 is inserted into the outer housing 210, and then the outer lid 280 is screwed against the sealing member 270.

Since the protrusion 221a is received in the groove 217, the water hole 210a and the water supply passage 221 can be inter-connected, and the first valves 211a,b,c and the second valves 224a,b are opened to thereby enable supply of the water and discharge of the purified water and the non-purified water.

In other words, when the inner housing 220 is assembled to the outer housing 210, the protrusion 223 performs to push down the flange unit 215 of the first valve 211a arranged in the water hole 210a, and successively, the associated first operation stem 214 is lowered and at the same time, the valve body 216 is also lowered to thereby open the water hole 210a, so that the water can be infused.

Subsequently, the water infused through the water hole 210a flows into the inner lid 260 through the water supply passage 221 and passes through the filtering member 230, so that the water can turn into the purified water free of various harmful substances contained in the water.

Furthermore, the purified water which has passed through the filtering member 230 is infused into the purified water tube 240 through the purified water infuse hole 240a to thereafter be discharged through the second valve 224a and the first valve 211b.

The protrusion 225b of valve 224a is operated to push the flange unit 215 of valve 211b to thereby cause the first operation stem 214 to descend, and at the same time, to cause the second operation stem 228 to ascend so that respective valve bodies 216 and 227 open the purified water hole 210b of valve 211b and the inter-connecting hole 220a of valve 224a. Accordingly, the purified water can be discharged into the inter-connecting hole 220a and the purified water hole 210b.

Meanwhile, when the filtering member 230 should be replaced after lapse of a predetermined period of time, separation of the outer lid 280 from the inner lid 260 enables the inner housing 220 to be separated from the outer housing 210, and at this time, the filtering member 230 in the separated inner housing can be easily replaced.

When the inner housing 220 is removed from the outer housing 210, the first and second valves 211a,b,c and 224a,b close to thereby cut off inflow or discharge of the water, purified water and the concentrated water.

In other words, when the inner housing 220 is separated, the first operation stems 214 are raised by the resilient members 213, thereby causing the valve bodies 216 to respectively close the water hole 210a, purified water hole 210b and the concentrated water hole 210c and to prevent the infuse and discharge of the fluid.

Therefore, leakage of the fluid in and out of the outer housing 210 can be prevented, Furthermore, second operation stems 228 of the valves 224a,b are pushed down by the resilient force of the resilient members 226, so that the valve bodies 227 close respective inter-connecting holes 220a and 220b to avoid the purified water or the concentrated water in the inner housing 220 from being leaked out.

Although the embodiments of the present invention related to a filtering apparatus employing a membrane filter, it should be noted that they are not restricted to the above-described examples.

By way of example, it should be also noted that the present invention can be applied to a filtering apparatus employing a ceramic filter, carbon filter, activated carbon filter or the like, wherein the valves 211c and 224b are not provided for discharging the non-purified water are not provided.

As seen from the foregoing, according to the embodiments of the present invention, the inner housing is separated from the outer housing, so that replacement of the filtering member can be easily carried to thereby facilitate the replacement operation of the filter, and leakage or counterflow of the water, purified water and non-purified water can be avoided to thereby allow the water purifier to be conveniently used, and a protrusion of the inner housing is inserted into a groove unit formed in the outer housing to thereby allow the water hole and the water supply passage to be inter-connected and to cause the first valves and the second valves to be interconnected for achieving a remarkable improvement in assembling the component parts of the apparatus.

What is claimed is:

1. A water purifier, comprising:
    an outer housing having a top opening at its upper end and including a first hole for admitting unfiltered water, a second hole for discharging filtered water, and a third hole for discharging unfiltered water;
    an inner housing disposed in said outer housing and sized to be removable and installable through said top opening;
    a filter element disposed in said inner housing and including an inflow side communicating with said first hole for receiving and filtering unfiltered water, and an outflow side communicating with said second hole for discharging filtered water;
    a first removable lid for closing said top opening of said outer housing, said inner housing and filter element being removable from said outer housing as a unit upon removal of said first lid therefrom; and
    a second removable lid for closing an open end of said inner housing, said filter element being removable from said inner housing upon removal of said second lid therefrom;
    said third hole communicating with said inflow side of said filter element for discharging unfiltered water for when the filter element is to be changed.

2. The water purifier according to claim 1 wherein said second and third holes are disposed adjacent a bottom of said outer housing.

3. The water purifier according to claim 2 wherein said first hole is disposed adjacent said bottom of said outer housing.

4. The water purifier according to claim 2 wherein said first hole is disposed adjacent a top of said outer housing.

5. The water purifier according to claim 2 wherein said inner housing includes a fourth hole communicating with said second hole, and a fifth hole communicating with said third hole.

6. The water purifier according to claim 5 wherein each of said first, second, third, fourth and fifth holes is provided with a valve which automatically closes when said inner housing is separated from said outer housing, and which automatically opens when said inner housing is installed in said outer housing.

7. The water purifier according to claim 6 wherein each of said valves comprises a vertically movable stem having a valve element thereon and being biased to a closed position.

8. The water purifier according to claim 1 wherein said filter element is of generally hollow cylindrical shape, an outer periphery thereof forming said inflow side, and said inner periphery forming said outflow side.

9. The water purifier according to claim 8 including a perforated discharge tube disposed within said filter element and communicating with said fourth and fifth holes.

10. The water purifier according to claim 1 wherein said outer housing includes a discharge hole for discharging water which has leaked from said inner housing to said outer housing.

11. The water purifier according to claim 1 wherein said inner housing forms a vertical water passage communicating at its lower end with said first hole.

12. The water purifier according to claim 1 wherein said outer and inner housings together form a protrusion-and-groove guide structure for orienting said inner housing relative to said outer housing in a predetermined manner.

13. The water purifier according to claim 1 wherein said filter element comprises a helically wound strip of fabric coated with activated carbon.

14. A water purifier, comprising:
    a fixed case having a vertical aperture formed therein;
    a housing fixedly connected to said case and including water inlet and outlet holes, and a filter-removal opening at its upper end;
    a filter element disposed in said housing and sized to be removable vertically through said opening; and
    a lid removably secured to said outer housing to close said opening and being removable vertically through said aperture of said case to enable said filter element to be removed vertically from said housing without detaching said housing from said case;
    wherein said lid includes an outward horizontal projection engaging a top surface of said case.

15. The water purifier according to claim 14 wherein said housing constitutes an outer housing, and further including an inner housing disposed in said outer housing, said filter element disposed in said inner housing, said inner housing and said filter element being removable as a unit through said aperture.

16. The water purifier according to claim 15 wherein an upper portion of said inner housing communicates with said first hole to receive unfiltered water therefrom, said upper portion of said inner housing having a larger cross section than a lower portion thereof.

17. The water purifier according to claim 14 wherein said filter element is selected from a group comprising a membrane filter, a ceramic filter, a carbon filter, or an activated carbon filter.

18. The water purifier according to claim 14 wherein said filter member comprises a cylindrically wound fabric coated with activated carbon.

19. A water purifier comprising:
    an outer housing having a first water inlet and a first water outlet;
    an inner housing disposed in said outer housing and having a second water inlet communicating with said first water inlet;

a perforated hollow water discharge tube disposed in said inner housing and communicating with said first water outlet;

a filter element of scroll shape disposed around an outer periphery of said tube for filtering water passing from an outer periphery of said filter element to said water discharge tube;

an inner lid removable connected to an upper end of said inner housing, said inner lid supporting an upper end of said water discharge tube; and an outer lid removably connected to an upper end of said outer housing.

20. The water purifier according to claim 19, further including a fixed case, said outer housing being fixed to said case so that said outer lid can be removed from said outer housing without removing said outer housing from said case.

21. The water purifier according to claim 20 wherein said case includes an aperture through which said outer lid is removable.

22. The water purifier according to claim 20 wherein said outer lid includes a horizontally outward projection engageable with an upper surface of said case.

23. The water purifier according to claim 19 wherein said filter element is selected from the group comprising: a membrane filter, a ceramic filter, a carbon filter, or an activated carbon filter.

24. The water purifier according to claim 19 wherein said second water inlet communicates with an upper portion of said inner housing which is of larger cross section than a lower portion thereof.

* * * * *